Patented July 10, 1951

2,560,339

UNITED STATES PATENT OFFICE 2,560,339

HYDROCARBON PLASTICIZERS FOR OIL-RESISTANT POLYMERS

Albert M. Gessler, Cranford, N. J., assignor to Standard Oil Development Company, a corporation of Delaware No Drawing. Application December 30, 1947, Serial No. 794,811

8 Claims. (Cl. 260—5)

This invention relates to synthetic rubber compositions and particularly to improved, plasticized, diolefin-acrylonitrile copolymer compositions and a method of preparing the same.

Synthetic rubber materials prepared by the copolymerization of a conjugated diolefin such as butadiene-1,3 and a nitrile such as acrylonitrile in aqueous emulsion have achieved considerable commercial importance particularly in view of their oil-resistant properties. The superiority in oil resistance of these copolymers over natural rubber has permitted them to compete with and even displace natural rubber despite the fact that the cost of these copolymers has been greater than that of natural rubber.

A major difficulty encountered with all synthetic rubbers of the butadiene type has been the fact that they are in general relatively hard, dry and non-tacky materials and, unlike natural rubber, they are incapable of being masticated to a soft, plastic condition which is not only desirable but necessary for proper compounding and processing into the desired articles.

In order to overcome this difficulty, it has been necessary to add softeners or plasticizers to these synthetic rubbery materials thereby improving their compounding and processing characteristics. The selection of suitable softeners particularly for diolefin-nitrile type synthetic rubbers has presented a number of serious difficulties since their properties are so radically different from natural rubber that many materials which are compatible with or exert a substantial plasticizing effect upon natural rubber or other rubbery hydrocarbons such as butadiene-styrene copolymers are incompatible with or do not effect any improvement in the softness or plasticity of diolefin-nitrile type synthetic rubbers.

In order to plasticize diolefin-nitrile elastomers, which are known technically under the generic term of GR–A type rubbers, the art has generally sought out those materials which are compatible with said rubbery GR–A type copolymers or are solvents or swelling agents therefor.

A number of cheap solvent type plasticizers are available for improving the processability of these copolymers. However, all of these cheap plasticizers are coal-tar oils or other aromatic coal-tar derivatives, are dark brown to black in color, and furthermore are relatively freely extracted from the plasticized copolymer on contact with gasoline, thereby discoloring the latter. These undesirable properties disqualify this type of cheap plasticizer from use with GR–A type rubbers where light-colored compounds are required or where a discolored extract cannot be tolerated on contact of the plasticized polymer with gasoline.

Where light-colored articles were desired, such as bowl scrapers, bath mats, gasoline hose, automobile matting and panelling, floor tile, whitewall tire compounds, medical supplies, dairy equipment, sealing members for food packaging and similar specialty products, the rubber industry was forced heretofore to rely on plasticizing agents which not only acted as solvents for the GR–A type polymers, but in addition such agents had to be substantially colorless.

The plasticizers most commonly used for the aforementioned specialty products have been dialkyl phthalates such as dimethyl, dibutyl, or dioctyl phthalates, dialkyl esters of dicarboxylic aliphatic acids such as dibutyl sebacate, and phosphoric acid esters such as tricresyl phosphate or tributoxyethyl phosphate. However, the preparation of the aforementioned organic chemicals usually involves a more or less complex chemical synthesis, and hence the chemicals themselves are about 10 times as expensive as the dark-colored coal-tar plasticizers mentioned previously. Since the plasticization of GR–A type elastomers requires relatively large proportions of plasticizing agent, e. g. 10 to 40 or more parts by weight per 100 parts of the elastomers, it will be readily appreciated that the use of the above-named organic chemicals as plasticizers becomes prohibitive where low-priced articles are to be manufactured. Accordingly, the use of GR–A type elastomers has been heretofore largely restricted to high-priced quality or specialty articles, or to low-priced articles wherein the use of coal-tar plasticizers could be tolerated despite the previously described disadvantages of the latter.

In the co-pending application Serial No. 719,637 filed on December 31, 1946, now Patent 2,545,516 issued March 20, 1951, of which the present application is a continuation in part, a new concept applicable to the plasticizing of GR–A elastomers was described, which concept offers a highly successful alternative to the use of the aforementioned expensive chemicals.

As indicated hereinabove, the rubber industry has used for the most part liquid plasticizers in which the polymer was soluble or at least capable of being swollen to considerable extent. Earlier workers have shown, for example, that the plasticity of a polymer-plasticizer system is proportional to the equilibrium swell of the vulcanized polymer after immersion in the plasticizer, and from this fact they have assumed that increased plasticity, in the sense of softness or ease of deformation, was indicative of improved processability. In direct contrast thereto it was found that this previously common assumption is not valid, as may be seen from subsequent Table I.

TABLE I

|  | Plasticizer | | |
| --- | --- | --- | --- |
|  | (1) | (2) | (3) |
| Equilibrium Swell of GR-A⁴ vulcanizate in plasticizer at 100° C.__percent_ | 10 | ∞ | 0 |
| Williams plasticity-recovery (80° C– 10 Kg.) of polymer-plasticizer compound ⁵ | 233–70 | 147–24 | >235 |
| Processability (extrudability) of polymer-plasticizer compound ⁶ | good | poor | very good |
| Volume percent swell after extrusion ⁶ | 96 | 233 | 100 |

¹ Diethylene glycol phthalate (viscosity, 615 centistokes at 210° F.).
² Dibutyl phthalate (viscosity, 9.58 centistokes at 100° F.).
³ Polyisobutylene (viscosity, 6,000 centistokes).
⁴ An emulsion copolymer containing about 72% of butadiene and 28% of acrylonitrile.
⁵ The compounds tested had the following recipe (in parts by weight): GR-A polymer, 100; zinc oxide, 5; Stearic Acid, 1; Channel black, 50; Plasticizer, 40. For comparison, a compound having the same recipe except that the plasticizer was completely omitted had a Williams plasticity-recovery of 297–104. The raw GR-A polymer alone had a Williams plasticity-recovery of 125–15.
⁶ The illustrative compounds tested consisted exclusively of 100 parts by weight of GR-A polymer and 20 parts of plasticizer, since all additional compounding ingredients tend to mask the effect of the different plasticizers.

In the above table dibutyl phthalate is a low-viscosity material in which the polymer is infinitely soluble whereas diethylene glycol phthalate and polyisobutylene are plasticizers of relatively high viscosity in which the polymer is insoluble or only very slightly soluble. It is apparent that the polymer-plasticizer system containing dibutyl phthalate is characterized by a low Williams value, indicating that the system is highly plastic or deformable, whereas the polymer-plasticizer systems containing diethylene glycol phthalate or polyisobutylene have a high Williams value, indicating that they are much less plastic and less deformable than the dibutyl phthalate system. However, processing data show clearly that the GR-A polymer-diethylene glycol phthalate or GR-A polymer-polyisobutylene systems are much easier to extrude without undue swell than is the polymer-dibutyl phthalate system.

It was described in the co-pending application, Serial No. 719,637 that a plasticizer, in order to be an effective processing aid for GR-A elastomers, should be of relatively high viscosity and be relatively insoluble in or incompatible with the elastomer. The diethylene glycol phthalate described in Table I hereinabove may be considered to lie near the lower limit of the scale of materials falling within this "high viscosity-low solubility" group. More particularly, it was described in said co-pending application that the preferred highly viscous plasticizers include polymeric hydrocarbons having a molecular weight between 8,000 and 20,000, suitable examples of such hydrocarbon plasticizers being polyisobutylene, GR-I type polymers, polybutadiene, polyisoprene and the like, none of which have any solvating action on GR-A polymers. Furthermore, it was described in said co-pending application that the plasticizing action of said polymeric plasticizers can be augmented by adding thereto certain complementary materials which also are substantially free of solvating action on the diolefin-nitrile copolymers to be plasticized. Such complementary materials include diethylene glycol phthalate, linseed oil or other drying oil polymer-gels.

The present invention is an improvement in the basic method for promoting the processability of GR-A type polymers by means of the polymeric hydrocarbon plasticizers of the type described in Serial No. 719,637 and involves the use of cheap, colorless or light-colored hydrocarbon oils in conjunction with the said polymeric hydrocarbon plasticizers as will be apparent from the subsequent examples. Furthermore, the instant invention is an improvement over that described earlier in that now it has been found possible to use as plasticizers oil-soluble polymers of any molecular weight up to about 150,000 (Staudinger).

*Example I*

A GR-A type emulsion copolymer constituted of 74% butadiene plus 26% acrylonitrile, characterized by an original Mooney viscosity of 95 was masticated by passing six times through a mill set at 0.007 inch. Thereafter a set of runs was made wherein 200 grams of this masticated GR-A copolymer were mixed on a mill with 40 grams of the several following hydrocarbon oils. The oils used, costing about as little as colored coal-tar plasticizers, had the following properties:

TABLE II

|  | Oil I (Telura-35) | Oil II (Nuso-55) | Oil III (WS-945) | Oil IV (Coray-230) |
| --- | --- | --- | --- | --- |
| Aniline point (°F.) | about 160 | 130 | 100 | 166 |
| Viscosity (Saybolt seconds): | | | | |
| at 100° F | 57 | 332 | 7,500 | 10,533 |
| at 210° F | 34 | 49.6 | 120 | 235 |
| Specific gravity | 0.866 | 0.951 | 0.989 | 0.960 |
| Flash point (°F.) | 235 | 390 | -------- | 525 |
| Pour Point (°F.) | -30 | 10 | -------- | 15 |

As soon as the oil was blended in, 50 grams of zinc oxide, 15 grams of sulfur and 10 grams of benzothiazyl disulfide were mixed into each of the oil-containing batches on the mill, and the resulting components were cured in the form of 6" x 6" pads at 300° F. for 20 minutes. When the pads were inspected 24 hours after curing, bleeding of the oils from the cured compounds was observed in the case of each batch tested, though said bleeding was found to be most severe in the batch containing oil I while the batches containing oils II, III and IV exhibited decreasingly less bleeding in the order stated. Hence it is concluded that among other factors the viscosity of the oil has an important effect on its tendency to bleed. However, when the same pads were inspected two weeks after curing, it was observed that the compound containing oil III was stickier than the compound containing oil IV, indicating that the relatively viscous oil III merely has a slower rate of bleeding but that oil IV is inherently less fugitive from the GR-A polymer as equilibrium conditions are approached. This behavior is apparently due to the fact that oil IV is more aromatic in character than oil III, as indicated by the respective aniline points, and hence the GR-A polymer is apparently more soluble in the former than in the latter, thereby retaining oil IV more firmly.

All of these runs prove that these same relatively fluid oils are not suited by themselves to serve as plasticizers for oil-resistant elastomers of the GR-A type, although these same oils have been used heretofore frequently and successfully as plasticizers for all-hydrocarbon elastomers such as natural rubber, GR-I (isobutylene-diolefin copolymers prepared according to U. S.

Patent 2,356,128) and GR-S (diolefin-styrene copolymerized in aqueous emulsion at moderate temperatures in the presence of a peroxide catalyst), which elastomers are more or less readily soluble in these oils.

In another set of runs, the same masticated GR-A elastomers as described above have been compounded in accordance with the present invention, the formulas used being shown in subsequent Table III.

viscosity to prevent bleeding. However, having herein described the basic concept of the invention, the most suitable proportion of any particular hydrocarbon polymer to oily plasticizer can be established by routine determinations.

*Example II*

Another set of runs was made to determine the usefulness of different types of solid hydrocar-

TABLE III

|  | Oil I | | | | Oil II | | | | Oil III | | | | Oil IV | | | |
| --- | --- | --- | --- | --- | --- | --- | --- | --- | --- | --- | --- | --- | --- | --- | --- | --- |
| Run No | 1 | 2 | 3 | 4 | 5 | 6 | 7 | 8 | 9 | 10 | 11 | 12 | 13 | 14 | 15 | 16 |
| GR-A [1] parts by weight | 100 | 100 | 100 | 100 | 100 | 100 | 100 | 100 | 100 | 100 | 100 | 100 | 100 | 100 | 100 | 100 |
| GR-I-40 [2] do | 5 | 10 | 15 | 20 | 5 | 10 | 15 | 20 | 5 | 10 | 15 | 20 | 5 | 10 | 15 | 20 |
| Oil I do | 20 | 20 | 20 | 20 | | | | | | | | | | | | |
| Oil II do | | | | | 20 | 20 | 20 | 20 | | | | | | | | |
| Oil III do | | | | | | | | | 20 | 20 | 20 | 20 | | | | |
| Oil IV do | | | | | | | | | | | | | 20 | 20 | 20 | 20 |
| Zinc oxide do | 5 | 5 | 5 | 5 | 5 | 5 | 5 | 5 | 5 | 5 | 5 | 5 | 5 | 5 | 5 | 5 |
| Sulfur do | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 |
| Benzothiazyl disulfide parts by weight | 1 | 1 | 1 | 1 | 1 | 1 | 1 | 1 | 1 | 1 | 1 | 1 | 1 | 1 | 1 | 1 |
| Appearance of slabs [3] | Slightly oily | No bleeding | | | Very slightly oily | No bleeding | | | No bleeding | | | | No bleeding | | | |

[1] Same as described at the head of Example I.
[2] Copolymer of isobutylene (97% in feed) and isoprene (3% in feed), prepared by Friedel-Crafts polymerization according to U. S. Pat. 2,356,128, Mooney viscosity 40.
[3] 6" x 6" slabs cured 20 minutes at 300° F.

The above results show that the bleeding encountered when the readily available and inexpensive hydrocarbon oils were used by themselves as plasticizers for GR-A type elastomers can be eliminated according to the instant invention, and the fugitive plasticizers can be used successfully by having present in the elastomer-oil system an all-hydrocarbon solid polymer such as GR-I which is soluble or colloidally dispersible in the fugitive hydrocarbon oil so as to increase the viscosity of the latter. It will be also observed that the higher the viscosity of the oily plasticizer, the less GR-I is needed to prevent the bleeding, i.e., the less polymer solute is required to raise the viscosity of the solute-in-oil solution above the critical value. One part of the GR-I per 2 parts of oily plasticizer appears to be sufficient in all instances tried, and in the case of oils III and IV even one part of GR-I per 4 parts of oil appears to be sufficient. Of course, it will be understood that this minimum ratio will vary depending primarily on viscosity and the relative aromaticity of the oily plasticizer used and also on the molecular weight and nature of the rubbery or oil-soluble hydrocarbon used, the main criterion being that sufficient solid hydrocarbon polymer must be present to form with the oil a colloidal dispersion or sol of sufficient over-all bon polymers conjointly with oily hydrocarbons as plasticizers for GR-A type elastomers. Specifically, a GR-A elastomer containing about 72% of combined butadiene and 28% of combined acrylonitrile and having an original Mooney viscosity of 95 was compounded with oil II defined in Table II hereinabove and with the different solid polymers indicated in Table IV.

The following procedure was followed: The GR-A polymer was broken down on a 6" x 12" mill and a second polymer as indicated in Table IV was added. The materials were thoroughly blended by cutting several times from each side of the mill. Then oil II was added and also blended in thoroughly. The starting mill temperature in each case was 90–95° F. and full cooling water was used in the mill rolls during mixing. Final roll temperatures were 105–115° F.

The resulting stocks were extruded in the form of tubing in a ½ Royle extruder at 220° F. (steam on head and barrel). The extruder worm turned at 80 R. P. M. while a 0.4" inside-diameter pin and a 0.3" outside-diameter pin were used to form the tubular specimens. The extrusion characteristics and also the appearance of the formed specimens recorded in Table IV were observed as indications of the plasticizing effect obtained.

TABLE IV

| Run No | 1 | 2 | 3 | 4 | 5 | 6 |
| --- | --- | --- | --- | --- | --- | --- |
| GR-A parts by weight | 200 | 200 | 200 | 200 | 200 | 200 |
| Oil II do | None | 11.6 | 11.6 | 11.6 | 11.6 | 11.6 |
| GR-S [1] do | None | None | 28.4 | None | None | None |
| Natural rubber do | None | None | None | 28.4 | None | None |
| S-60 [2] do | None | None | None | None | 28.4 | None |
| Solid polyisobutylene [3] do | None | None | None | None | None | 28.4 |
| Remarks | Too tough for satisfactory extrusion. | Satisfactory extrusion but tube is tacky, indicating bleeding of oil. | Satisfactory extrusion; no bleeding. | | | |

[1] A rubbery emulsion copolymer prepared from approximately 75 parts of butadiene and 25 parts of styrene (Staudinger M. W. about 60,000).
[2] A solid thermoplastic resin prepared from approximately 60 parts of styrene and 40 parts of isobutylene by low-temperature polymerization with aluminum chloride dissolved in an alkyl halide (as described in U. S. Patent 2,274,749).
[3] Commercial L. M. polyisobutylene, 12,000 molecular weight (Staudinger).

The above results indicate that solid hydrocarbon polymers of all kinds are suitable as the solutes which render the hydrocarbon oil plasticizer non-bleeding from GR-A compounds.

From the foregoing examples it is apparent that the instant invention provides means for the successful utilization of inexpensive and relatively non-aromatic hydrocarbon oils as plasticizers for highly polar and oil-resistant solid copolymers such as solid polymers or copolymers of acrylonitrile, resinous polymers or copolymers of vinyl chloride or vinyl acetate or mixtures thereof and other plastics which are not soluble in said hydrocarbon oils, whereas prior to this invention no method has been known for plasticizing oil-resistant polymers by means of these convenient fluid plasticizers because the latter bled from the compound after being mixed therein.

This fugitiveness of the oily plasticizers has now been eliminated by forming a sufficiently viscous, and hence non-bleeding colloidal dispersion or solution of a solid hydrocarbon polymer in the oily plasticizer. Such a dispersion may either be formed separately and the preformed dispersion added to the oil-resistant polymer which is to be plasticized, or the dispersion may be formed in situ, i. e. a sufficient proportion of suitable hydrocarbon polymer is mixed into the oil-resistant polymer and thereafter the oily plasticizer is worked into the mixture of polymers so that the hydrocarbon polymer becomes dissolved in the oil in the form of a properly viscous dispersion; or alternatively the oil may be mixed into the oil-resistant polymer first and the solid hydrocarbon polymer may be blended with the resulting mixture subsequently, or the plasticizer may even be added to the oil-resistant polymer while the latter is in latex form.

Whichever particular sequence of steps is employed, once a viscous dispersion of hydrocarbon polymer-in-oil is formed in the polymer to be plasticized, migration or bleeding of the otherwise fluid hydrocarbon oil is prevented while at the same time this viscous dispersion acts as a very effective processing aid. Obviously, the viscosity of this dispersion may be varied over a wide range depending on the molecular weight of the hydrocarbon polymer acting as the solute, the original viscosity of the fluid hydrocarbon plasticizer acting as the solvent, the concentration of solute in solvent, and finally also to some extent on the aromaticity of the solvent inasmuch as a more aromatic solvent will dissolve not only the hydrocarbon polymer but will also partially dissolve or at least swell the principal polymer to be plasticized.

The liquid plasticizers useful in the instant invention are oils ranging in viscosity from about 40 to 15,000 Saybolt seconds (at 100° F.), preferably hydrocarbon oils ranging from 50 to 11,000 Saybolt seconds (at 100° F.). Such oils may conveniently have an aniline point between about 80 and 200° F., preferably between 100 and 170° F. (thereby being "relatively non-aromatic"), and a flash point between about 200 and 600° F. In addition to hydrocarbon oils, cutting oils comprising a blend of mineral oil with sulfurized fatty oils are also useful.

The solid components of the plasticizer useful in the instant invention are solid or plastic hydrocarbon polymers having a molecular weight of at least about 8,000 so as to be capable of forming a sufficiently viscous colloidal dispersion in the liquid plasticizer component or oil to prevent the latter from bleeding. There is no definite upper limit to the molecular weight of the solid hydrocarbon plasticizer, the only requisite thereof being that it contain at least an oil-soluble fraction capable of dissolving in the liquid hydrocarbon oil. Generally, hydrocarbon polymers having a Staudinger molecular weight of 8,000 to 150,000 or even higher, and especially between 20,000 and 100,000 can be used successfully.

An excellent type of such solid hydrocarbon polymer is prepared by polymerizing isobutylene at temperatures below 0° C. in the presence of aluminum chloride or boron fluoride, the polymerization being well known per se. Such polyisobutylene of virtually any desired molecular weight may be readily prepared by controlling the temperature at which polymerization occurs and/or by controlling the purity of the feed stock, it being known that the lower the temperature of polymerization and the higher the purity of the isobutylene, the higher the molecular weight of the polymer formed.

Other types of suitable solid hydrocarbon polymers have been shown in the preceding specific examples. Generally speaking, the solid hydrocarbon polymers which are satisfactory solutes for the oily plasticizer may be solid polybutadiene or polyisoprene; emulsion copolymers of butadiene or isoprene or the like, particularly GR-S which is a well-known rubbery copolymer of a major proportion of butadiene with a minor proportion of styrene and having usually a Staudinger molecular weight of about 60,000; or solid copolymers of an isoolefin such as isobutylene with a small proportion, e. g. 2 to 5%, of a diolefin such as isoprene or the like and prepared at low temperatures in the presence of dissolved Friedel-Crafts catalysts by the method described in U. S. Patent 2,356,128, particularly useful examples of this type of polymer being GR-I elastomers having a Mooney viscosity between about 20 and 80 or preferably 30 to 60, and a Staudinger molecular weight of about 30,000 to 50,000, or solid copolymers of isobutylene and styrene prepared, for example, by the method described in U. S. Patent 2,274,749; solid polyethylene; masticated natural rubber and similar natural products; or mixtures of any two or more of the foregoing polymers.

The synthetic rubbery materials which are plasticized by the hydrocarbon polymeric materials in accordance with the present invention are the emulsion copolymers of a major proportion of a conjugated diolefin of from 4 to 6 carbon atoms per molecule, preferably butadiene-1,3 or isoprene and a minor proportion of an acrylic nitrile, preferably acrylonitrile or methacrylonitrile. Halogenated acrylonitriles such as alpha chloro-acrylonitrile are also useful as alternative nitrile comonomers. While the diolefin must constitute the preponderant amount of the polymerizable material, it is ordinarily preferable to utilize monomeric mixtures of from 55 to about 85 parts of diolefin with 45 to about 15 parts of nitrile.

The copolymers of diolefin and nitrile are prepared, as is well known in the art, by emulsifying the monomeric material in from an equal to a two-fold quantity of water utilizing a water-soluble soap or other surface active agent as an emulsifier, an oxygen-yielding polymerization catalyst such as hydrogen peroxide, alkali metal or ammonium persulfates and perborates and if desired, polymerization modifiers such as aliphatic mercaptans of at least six carbon atoms per molecule. Polymerization is ordinarily effected at about 20 to about 65° C. and is continued until the monomers are about 75 to 80% converted to polymers. Other polymers to which the present invention is applicable are oil-resistant polymers like polyvinyl chloride, polyvinyl acetate, polychloroprene (GR–M) and polyethylene sulfide elastomers prepared by the condensation of ethylene dichloride with sodium tetrasulfide (Thiokol, GR–P) and the like.

The amount of oil added is ordinarily between 5 and about 50, preferably between 15 and 30 parts per 100 parts of oil-resistant polymer and the amount of solid hydrocarbon added is ordinarily 20 and 200, preferably between 40 and 100 parts per 100 parts of oil added, the upper limit for the proportion of hydrocarbon polymer to oil being determined by the point where the plasticizer phase becomes so viscous as to be incompatible with the oil-resistant polymer with the result that a distinct two-phase system of very low cohesive force is formed, whereas the lower limit is determined by the point where the amount of hydrocarbon polymer added is inadequate to raise the viscosity of the hydrocarbon oil sufficiently to prevent bleeding.

In addition to the excellent plasticizing effect attained by means of the novel softening mixture of the present invention, the use of this softening mixture is also advantageous in improving the tack of oil-resistant polymers and in reducing the distortion of extruded shapes as they issue from the die of an extruder, caused by the release of the elastic stresses of the material extruded.

The novel plasticizing mixtures find particularly successful application in the formulation of compounds for rubber hose, floor tiles and the like, as illustrated by the following example.

*Example III*

Two compounds were prepared in accordance with the recipe set forth in subsequent Table V.

TABLE V

| Compound | I | II |
| --- | --- | --- |
| | Parts | Parts |
| GR-A (Perbunan-26) [1] | 100 | 100 |
| Polymerized castor oil gel | 28 | |
| GR-I-40 [2] | | 28 |
| Oil IV [3] | 20 | 20 |
| Polymer of indene, coumarone, etc. (Cumar P-10) [4] | 40 | 40 |
| Dibutyl phthalate | 10 | 10 |
| Medium hard clay (Suprex) | 400 | 400 |
| Titanium oxide (Titanox) | 40 | 40 |
| Sulfur | 15 | 15 |
| Tetramethyl thiuram monosulfide | 3 | 3 |
| Zinc Oxide | 25 | 25 |
| Stearic acid | 3 | 3 |

[1] Emulsion copolymer of approximately 28 parts of acrylonitrile and 72 parts of butadiene.
[2] Isobutylene-isoprene copolymer of Mooney viscosity 40.
[3] See Table II for definition of properties.
[4] See "Compounding Ingredients for Rubber," 2nd edition (1947); p. 186.

Both of the above compounds were cured for 10 minutes at 330° F. in the form of floor tiles. The tile prepared from compound I rapidly became oily and sticky after curing due to the fact that the oily plasticizer gradually bled to the surface. In contrast, the tile prepared from compound II showed no signs of bleeding even at temperatures as high as 100° F., and was characterized by a hard, permanently dry surface. These comparative results again show the great improvement obtainable by following the present invention which teaches a successful method for using hydrocarbon oils as plasticizers for oil-resistant polymers.

The foregoing description contains a number of concrete examples embodying the present invention. However, it will be understood that these examples are merely illustrations of the invention and not limitations thereof, and that numerous variations are possible without departing from the scope of the invention as defined in the following claims.

What is claimed:

1. The method of plasticizing polymers comprising mixing 100 parts of an oil-resistant conjugated diolefin-nitrile copolymer with 15 to 30 parts of a hydrocarbon oil having a viscosity between 50 to 11,000 Saybolt seconds at 100° F. and an aniline point between 100 and 170° F. and with 40 to 100 parts (per 100 parts of said oil) of an oil-soluble solid hydrocarbon polymer, and mechanically working the resulting mixture until at least 5 parts of said hydrocarbon polymer are dissolved in said oil.

2. The method according to claim 1 wherein said solid hydrocarbon polymer is a copolymer of a major proportion of isobutylene and a minor proportion of a conjugated $C_4$ to $C_6$ diolefin, said copolymer having a Mooney viscosity of 30 to 50 at 212° F.

3. The method according to claim 1 wherein the solid hydrocarbon polymer is polyisobutylene having a Staudinger molecular weight between 8,000 and 150,000.

4. The method according to claim 1 wherein the solid hydrocarbon polymer is natural rubber.

5. The method according to claim 1 wherein the solid hydrocarbon polymer is a rubbery emulsion copolymer of a major proportion of butadiene and a minor proportion of styrene.

6. The method of plasticizing polymers which comprises mixing 100 parts of an oil-resistant rubbery copolymer of 55 to 85% of a conjugated $C_4$ to $C_6$ diolefin and 45 to 15% of acrylonitrile, 5 to 50 parts of a hydrocarbon oil having a viscosity between 50 and 11,000 Saybolt seconds at 100° F. and an aniline point between 100 and 170° F., and 20 to 200 parts of an oil soluble solid hydrocarbon polymer per 100 parts of said oil, and mechanically working the mixture until at least 5 parts of the solid hydrocarbon polymer are dissolved in the oil.

7. The method of plasticizing polymers which comprises mixing 100 parts of an oil-resistant rubbery copolymer of 55 to 85% butadiene and 45 to 15% acrylonitrile, about 20 parts of a hydrocarbon oil having a viscosity between 50 and 11,000 Saybolt seconds at 100° F. and an aniline point between 100 and 170° F., and about 40 to 100 parts of a solid rubbery copolymer of a major proportion of isobutylene and a minor proportion of isoprene per 100 parts of said oil, and mechanically working the mixture until at least 5 parts of said hydrocarbon polymer are dissolved in said oil.

8. The method of plasticizing polymers which comprises mixing 100 parts of an oil-resistant solid polymer selected from the group consisting of conjugated diolefin-nitrile copolymers, vinyl chloride polymers, chloroprene polymers and polyethylene sulfide elastomers, 5 to 50 parts of a hydrocarbon oil having a viscosity between 50 and 11,000 Saybolt seconds at 100° F. and an aniline point between 100 and 170° F., and 20 to 200 parts of an oil soluble solid hydrocarbon polymer per 100 parts of said oil, and mechanically working the mixture until at least 5 parts of the solid hydrocarbon polymer are dissolved in the oil.

ALBERT M. GESSLER.

REFERENCES CITED

The following references are of record in the file of this patent:

UNITED STATES PATENTS

| Number | Name | Date |
|---|---|---|
| 2,138,895 | Wiezevich | Dec. 6, 1938 |
| 2,381,248 | Bascom | Aug. 7, 1945 |